Patented May 2, 1944

2,347,992

UNITED STATES PATENT OFFICE 2,347,992

DIAZINYL CARBOXY-ALKYL SULPHIDES AND SALTS THEREOF

Gaetano F. D'Alelio and James W. Underwood, Pittsfield, Mass., assignors to General Electric Company, a corporation of New York No Drawing. Application December 18, 1941, Serial No. 423,564

16 Claims. (Cl. 260—251)

This invention relates to new chemical compounds and more particularly to diazine derivatives. The invention especially is concerned with the production of new and useful diazinyl carboxy-alkyl sulphides and salts thereof.

The chemical compounds of this invention may be represented by the following general formula:

I
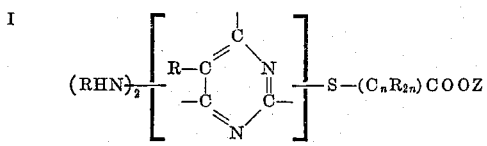

In the above formula $n$ represents an integer and is at least 1 and not more than 2, R represents a member of the class consisting of hydrogen and monovalent hydrocarbon and substituted hydrocarbon radicals, more particularly halo-hydrocarbon radicals, and Z represents a member of the class consisting of hydrogen and elements and radicals that can be substituted for the hydrogen atom of a —COOH grouping, more particularly the alkali metals (sodium, potassium, lithium, caesium and rubidium) and the ammonium (—NH$_4$) radical. Thus, when Z stands for hydrogen the diazinyl carboxy-alkyl sulphides of this invention may be represented by the formula II
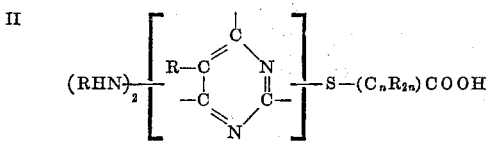

where $n$ and R have the meanings above given with reference to Formula I. When Z in Formula I is other than hydrogen, the compounds of the invention may be represented by the formula III
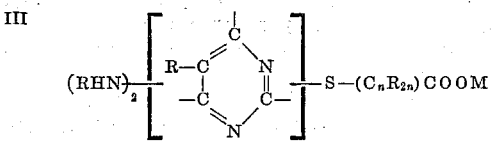

where M represents a member of the class consisting of elements and radicals that can be substituted for the hydrogen atom of a —COOH grouping, specifically the ammonium radical or an alkali metal, and $n$ and R have the meanings above given with reference to Formula I.

From a consideration of the above formulas it will be seen that, since $n$ represents an integer which is 1 or 2, the linkage of the —(C$_n$R$_{2n}$) COOZ grouping (Formula I) to the sulphur atom in all cases will be alpha or beta to the —COOZ grouping. It also will be observed that linkage of the diazinyl grouping to the sulphur atom is through a carbon atom.

Illustrative examples of radicals that R in the above formulas may represent are: aliphatic (e. g., methyl, ethyl, propyl, isopropyl, allyl, butyl, secondary butyl, isobutyl, butenyl, amyl, methallyl, ethallyl, tertiarybutyl, crotyl, heptyl, isoheptyl, octyl, decyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, etc. Preferably R in Formulas I, II and III is hydrogen. However, there also may be produced in accordance with the present invention chemical compounds such, for instance, as those represented by the general formulas:

IV
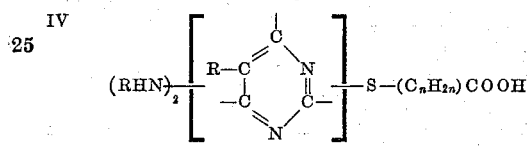

and, more particularly,

V
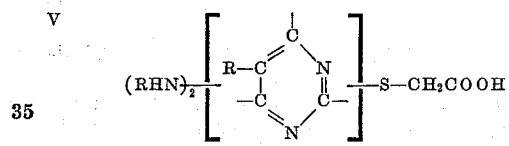

where $n$ and R have the same meanings as given above with reference to Formula I.

The new compounds of this invention may be used as chemotherapeutic agents and as intermediates in the preparation of derivatives thereof such as ureido, hydrazino, acyl, carbamyl, amidine, etc., derivatives of the individual compound embraced by Formula I. Compounds containing a —COOH grouping may be esterified or amidated; or the hydrogen of the carboxy grouping may be replaced by a substituent such, for instance, as an ammonium radical or a monovalent metal, e. g., an alkali metal such as sodium, potassium, lithium, etc., thereby to obtain compounds such as represented by Formula III. These new chemical compounds also may be compounded with rubber, both natural and synthetic, to modify the properties of the rubber.

The organic sulphides of the present invention, especially those containing a —COOH grouping, are particularly valuable in the preparation of synthetic resinous compositions. Thus they may be condensed with, for instance, aldehydes, including polymeric aldehydes and aldehyde-addition products, to yield condensation products of particular utility in the plastics and coating arts. Our new compounds containing a —COOH grouping are especially useful when intercondensed with amidogen-aldehyde (e. g., urea-formaldehyde, melamine-formaldehyde, etc.) partial condensation products to effect or to accelerate the conversion of such partial condensation products from a soluble, fusible state to a cured or insoluble and infusible state. Condensation products of these new organic sulphides with aldehydes are more fully described and are specifically claimed in our copending application Serial No. 432,894, filed February 28, 1942, and assigned to the same assignee as the present invention.

Various methods may be employed to produce the chemical compounds of this invention. We prefer to prepare them by effecting reaction, in the presence of a hydrohalide acceptor, between a diamino [(—NHR)$_2$] mercapto pyrimidine and a halo-alkyl monobasic acid or a water-soluble salt of such an acid, e. g., an ammonium salt or an alkali-metal salt. We prefer to use an alkali-metal salt, for instance the sodium or potassium salt, of a halo-alkyl monobasic acid. When a salt or the acid is used, there is first produced a salt (for example, an ammonium or an alkali-metal salt depending upon the particular starting reactant) of the diamino pyrimidyl carboxy-alkyl sulphide. The carboxy derivative is obtained by treating this salt with hydrochloric, hydrobromic, sulphuric or other suitable organic or inorganic acid in an amount just sufficient to decompose the salt and to convert the —COOM grouping of the pyrimidine derivative to a —COOH grouping.

Illustrative examples of mercapto pyrimidines that may be used, depending upon the particular end-product desired, are:

2-mercapto 4,6-diamino pyrimidine
2-mercapto 4,6-di-(methylamino) pyrimidine
2-mercapto 4,6-di-(anilino) pyrimidine
2-mercapto 4-ethylamino 6-toluido 5-butyl pyrimidine
2-mercapto 4-neopentylamino 6-xylidino pyrimidine
2-mercapto 4-propylamino 6-butylamino pyrimidine
2-mercapto 4-isobutylamino 6-amino pyrimidine
4-mercapto 2-methylamino 6-benzylamino 5-phenylpentyl pyrimidine (6-mercapto 2-methylamino 4-benzylamino 5-phenylpentyl pyrimidine)
4-mercapto 2-cyclopentylamino 6-phenethylamino 5-tolyl pyrimidine
4-mercapto 2-chlorotolylamino 6-phenylamino pyrimidine
4-mercapto 2-naphthylamino 6-butylphenylamino 5-naphthyl pyrimidine
4-mercapto 2-cyclohexylamino 6-methylamino 5-chloronaphthyl pyrimidine
4-mercapto 2,6-diamino pyrimidine
4-mercapto 2,6-di-(methylamino) pyrimidine
4-mercapto 2,6-di-(anilino) pyrimidine
4-mercapto 2,6-di-(chloroanilino) pyrimidine
2-mercapto 4,6-di-(chlorobutylamino) pyrimidine
2-mercapto 4,6-di-(bromonaphthylamino) pyrimidine
2-mercapto 4-amino 6-ethylamino pyrimidine
2-mercapto 4,6-di-(propylamino) pyrimidine
2-mercapto 4-allylamino 6-butylamino pyrimidine
2-mercapto 4-butylamino 6-cyclopentylamino pyrimidine
2-mercapto 4-(3'-butenylamino) 6-propylamino 5-methyl pyrimidine
2-mercapto 4-pentylamino 6-cyclohexylamino pyrimidine
4-mercapto 2-aminoanilino 6-ethylphenylamino 5-chlorophenyl pyrimidine
4-mercapto 2-cycloheptylamino 6-propylphenylamino 5-methyl pyrimidine
2-mercapto 4-isopropylanilino 6-phenylpropylamino pyrimidine
2-mercapto 4-dichloroanilino 6-chloroethylamino pyrimidine
2-mercapto 4-iodoanilino 6-methylamino pyrimidine
2-mercapto 4-amino 6-methylamino pyrimidine
2-mercapto 4-amino 6-benzylamino pyrimidine
2-mercapto 4-amino 6-bromoethylamino pyrimidine
2-mercapto 4-cyclohexenylamino 6-naphthylamino pyrimidine
2-mercapto 4-bromotoluido 6-benzylamino 5-chlorophenyl pyrimidine
2-mercapto 4,6-diamino 5-methyl pyrimidine
2-mercapto 4,6-diamino 5-phenyl pyrimidine
4-mercapto 2,6-diamino 5-chlorobutyl pyrimidine
2-mercapto 4,6-diamino 5-cyclohexyl pyrimidine
2-mercapto 4,6-diamino 5-naphthyl pyrimidine
2-mercapto 4,6-di-(cyclohexylamino) pyrimidine Illustrative examples of halo-alkyl monobasic acids and water-soluble salts of halo-alkyl monobasic acids that may be employed, depending upon the particular end-product desired, are:

Chloroacetic acid
Alpha-chloropropionic acid
Beta-chloropropionic acid
Alpha-bromopropionic acid
Beta-bromopropionic acid
Alpha-iodopropionic acid
Beta-iodopropionic acid
Alpha-chlorobutyric acid
Beta-chlorobutyric acid
Alpha-chloroisobutyric acid
Beta-chloroisobutyric acid
Alpha-bromobutyric acid
Phenyl chloroacetic acid
Bromoacetic acid
Iodoacetic acid
Alpha-chloro pentanoic acid
Beta-chloro pentanoic acid
Beta-iodo pentanoic acid
Alpha-tolyl beta-phenyl beta-chlorobutyric acid
Alpha-benzyl alpha-cyclopentyl beta, beta-dinaphthyl beta-iodo propionic acid
Alpha-naphthyl beta-chlorophenyl beta-bromo butyric acid
Alpha-methyl alpha-chloro propionic acid
Alpha, alpha, beta-trimethyl beta-bromo butyric acid
Alpha-phenyl alpha-iodo butyric acid
Tolyl chloroacetic acid
Xylyl bromoacetic acid and the alkali-metal and ammonium salts of halo-alkyl monobasic acids such as above mentioned by way of illustration, for example the sodium, potassium, lithium, etc., salts of such halo-alkyl monobasic acids.

Various hydrohalide acceptors may be employed. We prefer to use a hydrohalide acceptor that will react with the mercapto pyrimidine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino pyrimidine and the halo-alkyl monobasic acid (or water-soluble salt thereof) may be carried out in any suitable manner, but preferably is effected in the presence of a suitable solvent or mixture of solvents. Although various solvents and solvent mixtures may be employed, for economic reasons and because of their eminent suitability we prefer to use water or a mixture of water and alcohol. The reaction may be carried out under a variety of temperature and pressure conditions, for instance at normal or at elevated temperatures and at atmospheric, sub-atmospheric or super-atmospheric pressures.

When the starting reactant is a halo-alkyl monobasic acid, the reaction may be represented by the following general equation:

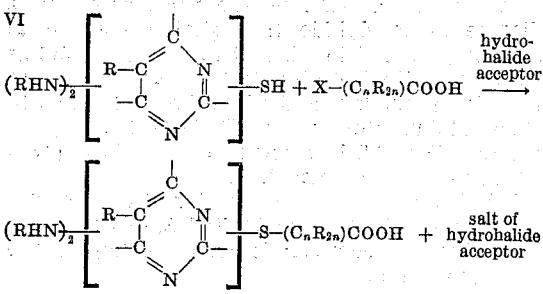

In the above equation X represents halogen, and $n$ and R have the same meanings as given above with reference to Formula I.

When a water-soluble salt, specifically an ammonium salt or an alkali-metal salt, of a halo-alkyl monobasic acid is used as a starting reactant in the preparation of a diamino pyrimidyl carboxy-alkyl sulphide, the following equations illustrate the reaction:

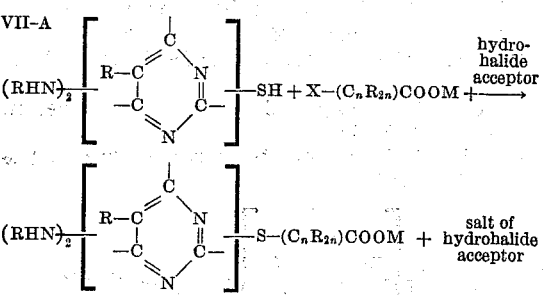

and

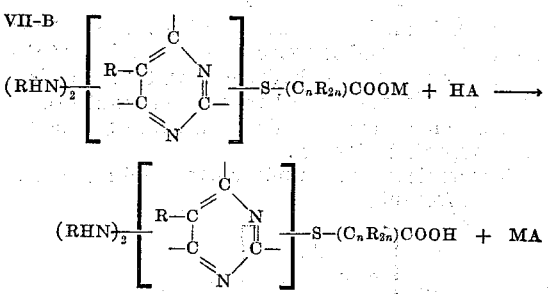

In the above equations (VII-A and VII-B) HA represents an acid capable of converting the —COOM grouping of the compound treated to a —COOH grouping, specifically an inorganic acid (e. g., hydrochloric, hydrobromic, sulphuric, etc.), $n$ and R have the meanings given above with reference to Formula I, and M has the meaning given above with reference to Formula III. MA represents the salt of the acid represented by HA.

The new chemical compounds of this invention also may be prepared by effecting reaction between a halogenated diamino pyrimidine (that is, a diamino pyrimidine having a halogen atom attached directly to a carbon atom of the pyrimidine nucleus) and a mercapto-alkyl monobasic acid (or a suitable salt thereof, e. g., the alkali-metal salt thereof) in the presence of a hydrohalide acceptor. This reaction may be carried out by any suitable means but preferably is effected in the presence of an anhydrous solvent. The other conditions of reaction may be the same as described above with reference to the first-mentioned method of preparation.

In order that those skilled in the art better may understand how the present invention may be carried into effect, the following illustrative examples are given. All parts are by weight.

*Example 1*

This example illustrates the preparation of 4,6-diamino pyrimidyl-2 carboxy-methyl sulphide.

| | Parts |
|---|---|
| 2-mercapto 4,6-diamino pyrimidine | 100.0 |
| Sodium chloroacetate | 82.0 |
| Sodium hydroxide | 30.0 |
| Water | 500.0 |

The stated amounts of 2-mercapto 4,6-diamino pyrimidine and sodium hydroxide were dissolved in the stated amount of water. The sodium chloroacetate was now added and the resulting mixture was heated under reflux at the boiling temperature of the mass for 30 minutes, after which the mass was allowed to stand at room temperature for about 16 hours. In this way there was formed in solution the sodium salt of 4,6-diamino pyrimidyl-2 carboxy-methyl sulphide. An acid, specifically hydrochloric acid, was added to the solution in an amount just sufficient to make it faintly acid to litmus. A crystalline precipitate comprising 4,6-diamino pyrimidyl-2 carboxy-methyl sulphide separated from the acidified solution. This precipitate was filtered off, washed free of soluble impurities such as the chlorides, and then dried.

*Example 2*

2,6-diamino pyrimidyl-4 carboxy-methyl sulphide, which also may be named 2,4-diamino pyrimidyl-6 carboxy-methyl sulphide, is prepared in essentially the same manner as described under Example 1 with the exception that 100 parts of 4-mercapto 2,6-diamino pyrimidine is used as a starting reactant instead of 100 parts of 2-mercapto 4,6-diamino pyrimidine.

*Example 3*

4,6-di-(methylamino) pyrimidyl-2 carboxy-methyl sulphide is prepared in essentially the same manner as described under Example 1 with the exception that 119 parts of 2-mercapto 4,6-di-(methylamino) pyrimidine is employed as a starting reactant in place of 100 parts of 2-mercapto 4,6-diamino pyrimidine.

*Example 4*

4,6-diamino pyrimidyl-2 alpha-(carboxy-ethyl) sulphide is prepared in essentially the same manner as described under Example 1 with the exception that 91.8 parts of the sodium salt of alpha - chloropropionic acid (sodium alpha-chloropropionate) is employed instead of 82.0 parts sodium chloroacetate.

*Example 5*

4,6-diamino pyrimidyl-2 beta-(carboxy-ethyl) sulphide is prepared in essentially the same manner as described under Example 1 with the exception that 91.8 parts of the sodium salt of beta-chloropropionic acid (sodium beta-chloropropionate) is used in place of 82.0 parts sodium chloroacetate.

Other examples of the chemical compounds of this invention are listed below:

4-amino 6-methylamino pyrimidyl-2 carboxy-methyl sulphide
2-amino 6-ethylamino pyrimidyl-4 carboxy-methyl sulphide
4,6-diamino 5-methyl pyrimidyl-2 carboxy-methyl sulphide
2,6-diamino 5-methyl pyrimidyl-4 carboxy-methyl sulphide
2,6-diamino pyrimidyl-4 alpha-(carboxy-ethyl) sulphide
2,6-diamino pyrimidyl-4 beta-(carboxy-ethyl) sulphide
4,6-di-(methylamino) pyrimidyl-2 beta-(carboxy-ethyl) sulphide
4,6-di-(ethylamino) pyrimidyl-2 carboxy-methyl sulphide
4,6-di-(anilino) pyrimidyl-2 carboxy-methyl sulphide
4,6-di-(anilino) 5-methyl pyrimidyl-2 alpha-(carboxy-ethyl) sulphide
4-ethylamino 6-anilino 5-butyl pyrimidyl-2-alpha-(alpha-methyl carboxy-ethyl) sulphide
4,6 - di - (chloroanilino) pyrimidyl - 2 carboxy-methyl sulphide
4,6-di-(cyclohexylamino) pyrimidyl-2 alpha-(carboxy-ethyl) sulphide
4,6-di-(methylamino) pyrimidyl-2 alpha-(carboxy-propyl) sulphide
4-propylamino 6-xylidino 5-methyl pyrimidyl-2 alpha-(alpha-phenyl carboxy-propyl) sulphide
4-methylamino 6-toluido pyrimidyl-2 beta-(carboxy-ethyl) sulphide
2-benzylamino 6-phenethylamino pyrimidyl-4 alpha-(alpha-phenyl beta-tolyl carboxy-ethyl) sulphide
4-cyclopentylamino 6-xylidino pyrimidyl-2 beta-(alpha, alpha-dibutyl beta-benzyl carboxy-propyl) sulphide
4 - methylamino 6 - naphthylamino 5 - methyl pyrimidyl-2 alpha-(carboxy-ethyl) sulphide
4-anilino 6-methylamino pyrimidyl-2 carboxy-methyl sulphide
2-cyclopentylamino 6-phenethylamino 5-tolyl pyrimidyl-4 carboxy-methyl sulphide
4,6-diamino pyrimidyl-2 beta-(alpha-cyclohexyl carboxy-butyl) sulphide
4-amino 6-allylamino pyrimidyl-2 5-cyclohexenyl carboxy-methyl sulphide
4,6-di-(naphthylamino) pyrimidyl-2 alpha-(carboxy-ethyl) sulphide
2-chlorotolylamino 6-amino pyrimidyl-4 beta-(carboxy-ethyl) sulphide
4,6-diamino pyrimidyl-2 alpha-(carboxy-propyl) sulphide
4,6-diamino pyrimidyl-2 carboxy-(chlorophenyl)-methyl sulphide
2,6-diamino pyrimidyl-4 beta-(carboxy-propyl) sulphide
4,6-diamino pyrimidyl-2 alpha-(carboxy-butyl) sulphide
2,6-diamino pyrimidyl-4 beta-(carboxy-butyl) sulphide
4,6-diamino pyrimidyl-2 alpha-(carboxy-pentyl) sulphide
4,6-diamino pyrimidyl-2 beta-(carboxy-pentyl) sulphide
4,6-diamino pyrimidyl-2 beta-(alpha-chlorophenyl carboxy-butyl) sulphide
4,6-diamino pyrimidyl-2 alpha-(carboxy-hexyl) sulphide
2,6-diamino pyrimidyl-4 beta-(carboxy-hexyl) sulphide and the ammonium and alkali-metal (e. g., sodium, potassium, etc.) salts of the above-mentioned sulphides.

In a manner similar to that described above with particular reference to the diamino [(—NHR)$_2$] pyrimidyl (or 1,3-diazinyl) carboxy-methyl and carboxy-ethyl sulphides, corresponding derivatives of the 1,2-diazines and of the 1,4-diazines may be prepared. It also will be understood by those skilled in the art from the foregoing description of the preparation of a diazine monosulphide that similar compounds may be prepared in which two or three sulphur atoms are attached directly to a carbon atom of the diazine nucleus and which have attached to each sulphur atom a —($C_nR_{2n}$)COOZ grouping, where $n$, R and Z have the meanings above given with reference to Formula I.

What we claim as new and desire to secure by Letters Patent of the United States is:

1. Chemical compounds corresponding to the general formula

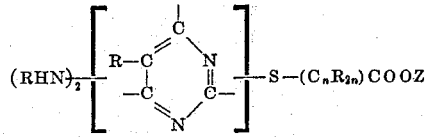

where $n$ is an integer and is at least 1 and not more than 2, R represents a member of the class consisting of hydrogen and monovalent hydrocarbon and halo-hydrocarbon radicals, and Z represents a member of the class consisting of hydrogen, the ammonium radical and alkali metals.

2. Chemical compounds as in claim 1 wherein R represents hydrogen.

3. Chemical compounds corresponding to the general formula

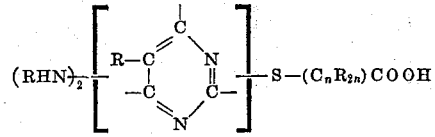

where $n$ is an integer and is at least 1 and not more than 2, and R represents a member of the class consisting of hydrogen and monovalent hydrocarbon and halo-hydrocarbon radicals.

4. Chemical compounds as in claim 3 wherein R represents hydrogen.

5. Chemical compounds corresponding to the general formula

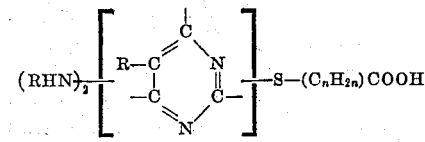

where $n$ is an integer and is at least 1 and not more than 2, and R represents a member of the class consisting of hydrogen and monovalent hydrocarbon and halo-hydrocarbon radicals.

6. A diamino pyrimidyl carboxy-methyl sulphide.

7. 4,6-diamino pyrimidyl-2 carboxy-methyl sulphide.

8. A diamino pyrimidyl carboxy-ethyl sulphide.

9. 4,6-diamino pyrimidyl-2 alpha-(carboxyethyl) sulphide.

10. 4,6-diamino pyrimidyl-2 beta-(carboxyethyl) sulphide.

11. The method of preparing chemical compounds corresponding to the general formula

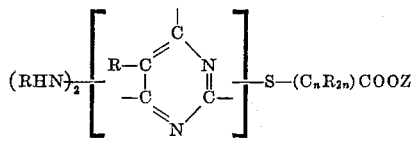

where $n$ is an integer and is at least 1 and not more than 2, R represents a member of the class consisting of hydrogen and monovalent hydrocarbon and halo-hydrocarbon radicals, and Z represents a member of the class consisting of hydrogen, the ammonium radical and alkali metals, said method comprising effecting reaction, in the presence of a hydrohalide acceptor, between (1) a mercapto diazine corresponding to the general formula

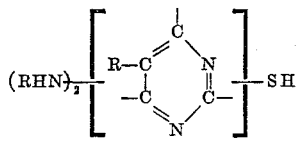

where R has the meaning above given, and (2) a compound corresponding to the general formula

$$X-(C_nR_{2n})COOZ$$

where X represents halogen, and $n$, R and Z have the meanings above given.

12. A method as in claim 11 wherein the hydrohalide acceptor is an alkali-metal hydroxide.

13. The method which includes the step of treating with an inorganic acid a compound corresponding to the general formula

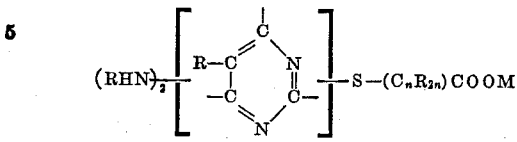

where $n$ is an integer and is at least 1 and not more than 2, R represents a member of the class consisting of hydrogen and monovalent hydrocarbon and halo-hydrocarbon radicals, and M represents a member of the class consisting of the ammonium radical and alkali metals, said acid being employed in an amount just sufficient to convert the —COOM grouping of the said compound to a —COOH grouping.

14. The method of preparing a diamino pyrimidyl carboxy-methyl sulphide which comprises effecting reaction, in the presence of a hydrohalide acceptor, between a mercapto diamino pyrimidine and an alkali-metal salt of chloroacetic acid thereby to obtain the alkali-metal salt of a diamino pyrimidyl carboxy-methyl sulphide, and treating the said alkali-metal salt with an inorganic acid in an amount just sufficient to convert it to the corresponding diamino pyrimidyl carboxy-methyl sulphide.

15. A method as in claim 14 wherein the hydrohalide acceptor is an alkali-metal hydroxide.

16. The method of preparing 4,6-diamino pyrimidyl-2 carboxy-methyl sulphide which comprises effecting reaction, in the presence of sodium hydroxide, between 2-mercapto 4,6-diamino pyrimidine and sodium chloroacetate thereby to obtain the sodium salt of 4,6-diamino pyrimidyl-2 carboxy-methyl sulphide, and treating the said sodium salt with hydrochloric acid in an amount just sufficient to form 4,6-diamino pyrimidyl-2 carboxy-methyl sulphide.

GAETANO F. D'ALELIO.
JAMES W. UNDERWOOD.

CERTIFICATE OF CORRECTION.

Patent No. 2,347,992. May 2, 1944.

GAETANO F. D'ALELIO, ET AL.

It is hereby certified that error appears in the printed specification of the above numbered patent requiring correction as follows: Page 2, first column, line 26, for "a salt or" read --a salt of--; page 4, first column, line 38, for "pyrimidyl-2-" read -- pyrimidyl-2 --; and that the said Letters Patent should be read with this correction therein that the same may conform to the record of the case in the Patent Office.

Signed and sealed this 25th day of July, A. D. 1944.

Leslie Frazer
Acting Commissioner of Patents.

(Seal)